US011157935B1

(12) United States Patent
Perry et al.

(10) Patent No.: US 11,157,935 B1
(45) Date of Patent: Oct. 26, 2021

(54) SYSTEMS AND METHODS FOR SELF-GENERATION OF E-COUPONS

(75) Inventors: Dickson Perry, Dallas, TX (US); David H. Tannenbaum, Dallas, TX (US)

(73) Assignee: Excentus Corporation, Dallas, TX (US)

( * ) Notice: Subject to any disclaimer, the term of this patent is extended or adjusted under 35 U.S.C. 154(b) by 0 days.

(21) Appl. No.: 12/960,072

(22) Filed: Dec. 3, 2010

(51) Int. Cl.
*G06Q 30/00* (2012.01)
*G06Q 30/02* (2012.01)

(52) U.S. Cl.
CPC ................ *G06Q 30/0222* (2013.01)

(58) Field of Classification Search
CPC .................................................. G06Q 30/0222
USPC ....................................................... 705/14.23
See application file for complete search history.

(56) References Cited

U.S. PATENT DOCUMENTS

| | | |
|---|---|---|
| 4,723,212 A | 2/1988 | Mindrum et al. |
| 4,949,256 A | 8/1990 | Humble |
| 5,185,695 A | 2/1993 | Pruchnicki |
| 5,420,606 A | 5/1995 | Begum et al. |
| 5,483,049 A | 1/1996 | Schulze |
| 5,502,636 A | 3/1996 | Clarke |
| 5,710,886 A | 1/1998 | Christensen |
| 5,822,735 A | 10/1998 | Lapa et al. |
| 5,905,246 A | 5/1999 | Fajkowski |
| 6,000,608 A | 12/1999 | Dorf |
| 6,032,136 A | 2/2000 | Brake, Jr. et al. |
| 6,076,068 A | 6/2000 | DeLapa et al. |
| 6,189,787 B1 | 2/2001 | Dorf |
| 6,292,786 B1 | 9/2001 | Deaton et al. |
| 6,298,329 B1 | 10/2001 | Walker et al. |
| 6,332,126 B1 | 12/2001 | Peirce et al. |
| 6,332,128 B1 | 12/2001 | Nicholson |
| 6,450,407 B1 | 9/2002 | Freeman et al. |
| 6,594,640 B1 | 7/2003 | Postrel |
| 6,741,968 B2 | 5/2004 | Jacoves et al. |
| 6,865,547 B1 | 3/2005 | Brake, Jr. et al. |
| 6,947,898 B2 | 9/2005 | Postrel |
| 6,980,960 B2 | 12/2005 | Hajdukiewicz et al. |
| 7,054,830 B1 | 5/2006 | Eggleston et al. |
| 7,072,864 B2 | 7/2006 | Brake, Jr. et al. |
| 7,096,190 B2 | 8/2006 | Postrel |
| 7,263,507 B1 | 8/2007 | Brake, Jr. et al. |
| 7,268,668 B2 | 9/2007 | Beenau et al. |
| 7,392,224 B1 | 6/2008 | Bauer et al. |
| 7,506,804 B2 | 3/2009 | Zaikowski et al. |
| 7,624,040 B2 | 11/2009 | Postrel |

(Continued)

OTHER PUBLICATIONS

U.S. Appl. No. 10/764,930, filed Aug. 12, 2004, Nicholson.

(Continued)

*Primary Examiner* — Michael W Schmucker
(74) *Attorney, Agent, or Firm* — Norton Rose Fulbright US LLP (57) ABSTRACT

Systems and methods are presented for allowing E-coupons to be generated by a customer based, at least in part, by actions taken by the customer. In one embodiment, a pyramid arrangement is disclosed in which the customer obtains E-coupons based primarily on activities performed by someone else in the pyramid. In another embodiment, the customer may make a purchase and credits for that purchase may be applied to another customer's account in the form of an E-coupon.

16 Claims, 6 Drawing Sheets

(56) References Cited

U.S. PATENT DOCUMENTS

| | | | |
|---|---|---|---|
| 7,624,041 B2 | 11/2009 | Postrel | |
| 7,660,763 B1 | 2/2010 | Brake, Jr. et al. | |
| 7,676,393 B2 | 3/2010 | Postrel | |
| 7,680,687 B2 | 3/2010 | Postrel | |
| 7,680,688 B2 | 3/2010 | Hessburg et al. | |
| 7,686,218 B2 | 3/2010 | Hessburg et al. | |
| 7,707,111 B2 | 4/2010 | Brake, Jr. et al. | |
| 7,716,080 B2 | 5/2010 | Postrel | |
| 7,742,942 B2 | 6/2010 | Nicholson | |
| 7,761,378 B2 | 7/2010 | Postrel | |
| 7,765,124 B2 | 7/2010 | Postrel | |
| 7,742,943 B2 | 8/2010 | Postrel | |
| 7,769,630 B2 | 8/2010 | Postrel | |
| 7,801,799 B1 | 9/2010 | Brake, Jr. et al. | |
| 7,828,206 B2 | 11/2010 | Hessburg et al. | |
| 8,010,405 B1 | 8/2011 | Bortolin et al. | |
| 8,073,736 B2 | 12/2011 | Blagg et al. | |
| 8,195,507 B2 | 6/2012 | Postrel | |
| 8,285,588 B2 | 10/2012 | Postrel | |
| 8,317,094 B2 | 11/2012 | Lehman | |
| 8,423,402 B2 | 4/2013 | Postrel | |
| 8,433,608 B2 | 4/2013 | Bortolin et al. | |
| 8,452,647 B2 | 5/2013 | Postrel | |
| 8,452,651 B2 | 5/2013 | Postrel | |
| 8,447,650 B2 | 6/2013 | Postrel | |
| 8,478,638 B2 | 7/2013 | Postrel | |
| 8,478,640 B2 | 7/2013 | Postrel | |
| 8,489,513 B2 | 7/2013 | Bishop et al. | |
| 8,606,631 B2 | 12/2013 | Blagg | |
| 8,612,290 B2 | 12/2013 | Postrel | |
| 8,676,642 B1 | 3/2014 | Sheley | |
| 8,682,791 B2 | 3/2014 | Bles et al. | |
| 8,695,875 B1 | 4/2014 | Segura | |
| 8,701,989 B2 | 4/2014 | Lehman | |
| 8,725,564 B2 | 5/2014 | Postrel | |
| 8,738,429 B2 | 5/2014 | Shepard | |
| 8,775,241 B2 | 7/2014 | Bortolin et al. | |
| 8,781,891 B2 | 7/2014 | Postrel | |
| 8,783,561 B2 | 7/2014 | Wesley | |
| 8,799,063 B2 | 8/2014 | Postrel | |
| 8,799,065 B2 | 8/2014 | Reuthe et al. | |
| 8,939,357 B1 | 1/2015 | Perry | |
| 9,038,893 B2 | 5/2015 | Kirkham | |
| 9,135,612 B1 | 9/2015 | Proctor, Jr. et al. | |
| 9,224,154 B2 | 12/2015 | Wesley | |
| 9,898,733 B1 | 2/2018 | Perry | |
| 2001/0049626 A1 | 12/2001 | Nicholson | |
| 2002/0107738 A1* | 8/2002 | Beach | G06Q 20/20 705/14.38 |
| 2002/0143616 A1 | 10/2002 | Hajdukiewicz et al. | |
| 2002/0143619 A1 | 10/2002 | Laurie | |
| 2002/0178013 A1 | 11/2002 | Hoffman et al. | |
| 2003/0033154 A1 | 2/2003 | Hajdukiewicz et al. | |
| 2003/0040964 A1 | 2/2003 | Lacek | |
| 2003/0106934 A1 | 6/2003 | McCall et al. | |
| 2003/0130891 A1 | 7/2003 | Jacobs | |
| 2004/0158493 A1* | 8/2004 | Nicholson | G06Q 20/387 705/14.25 |
| 2004/0220861 A1* | 11/2004 | Morciniec | G06Q 30/0235 705/14.35 |
| 2004/0243478 A1* | 12/2004 | Walker | G06Q 10/087 705/26.1 |
| 2004/0249710 A1 | 12/2004 | Smith et al. | |
| 2005/0021401 A1 | 1/2005 | Postrel | |
| 2005/0096976 A1 | 5/2005 | Nelms | |
| 2005/0131761 A1 | 6/2005 | Trika et al. | |
| 2005/0149402 A1 | 7/2005 | Nicholson | |
| 2005/0234776 A1 | 10/2005 | Jacoves et al. | |
| 2005/0234777 A1* | 10/2005 | Bird | G06Q 20/204 705/17 |
| 2005/0251440 A1 | 11/2005 | Bednarek | |
| 2005/0267800 A1 | 12/2005 | Tietzen et al. | |
| 2006/0190331 A1 | 8/2006 | Tollinger et al. | |
| 2006/0235747 A1 | 10/2006 | Hammond et al. | |
| 2006/0293953 A1 | 12/2006 | Nicholson | |
| 2007/0152038 A1 | 7/2007 | Ciancio et al. | |
| 2007/0174126 A1 | 7/2007 | McCall et al. | |
| 2008/0071614 A1 | 3/2008 | Mebruer | |
| 2008/0082420 A1 | 4/2008 | Kargman et al. | |
| 2008/0126208 A1 | 5/2008 | Nicholson et al. | |
| 2008/0208688 A1 | 8/2008 | Byerley et al. | |
| 2008/0221984 A1 | 9/2008 | Abhyanker | |
| 2008/0262928 A1 | 10/2008 | Michaelis | |
| 2009/0030798 A1 | 1/2009 | Otto et al. | |
| 2009/0050692 A1 | 2/2009 | Ludlow et al. | |
| 2009/0094158 A1 | 4/2009 | Fein et al. | |
| 2009/0119174 A1 | 5/2009 | Pfister | |
| 2009/0248518 A1* | 10/2009 | Shigematsu | G06Q 20/04 705/38 |
| 2009/0259485 A1 | 10/2009 | Perlman et al. | |
| 2010/0017284 A1 | 1/2010 | Ross et al. | |
| 2010/0094690 A1 | 4/2010 | Beal | |
| 2010/0114683 A1* | 5/2010 | Wessels et al. | 705/14.13 |
| 2010/0153205 A1* | 6/2010 | Retter et al. | 705/14.26 |
| 2010/0203942 A1 | 8/2010 | Walker et al. | |
| 2010/0241573 A1 | 9/2010 | Joa et al. | |
| 2011/0071890 A1 | 3/2011 | Hart et al. | |
| 2011/0087531 A1 | 4/2011 | Winters et al. | |
| 2011/0208576 A1 | 8/2011 | Durgin et al. | |
| 2011/0231321 A1* | 9/2011 | Milne | G06Q 30/00 705/80 |
| 2011/0264527 A1 | 10/2011 | Fitzpatrick et al. | |
| 2011/0282784 A1 | 11/2011 | Nelsen | |
| 2012/0029992 A1 | 2/2012 | De Facendis | |
| 2012/0066047 A1 | 3/2012 | Muthugopalakrishnan et al. | |
| 2012/0197705 A1 | 8/2012 | Mesaros | |
| 2013/0046605 A1 | 2/2013 | Baron et al. | |
| 2013/0091001 A1 | 4/2013 | Jia et al. | |
| 2013/0151312 A1 | 6/2013 | Logan | |
| 2013/0246138 A1 | 9/2013 | Johnson et al. | |
| 2013/0248591 A1 | 9/2013 | Look et al. | |
| 2013/0282468 A1 | 10/2013 | Michael | |
| 2013/0317894 A1 | 11/2013 | Zhu et al. | |
| 2013/0317897 A1 | 11/2013 | Nicholson | |
| 2014/0025518 A1 | 1/2014 | Look | |
| 2015/0012347 A1 | 1/2015 | Nicholson | |
| 2015/0287068 A1 | 10/2015 | Porco et al. | |

OTHER PUBLICATIONS

U.S. Appl. No. 11/158,674, filed Dec. 28, 2006, Nicholson.
U.S. Appl. No. 12/832,788, Perry.
"Point of Sale," in Wikipedia: The Free Encyclopedia; available from http://web.archive.org/web/20101103083636/http:/en.wikipedia.org/wiki/Point_of_sale; Internet; retrieved Mar. 21, 2016.
U.S. Appl. No. 60/184,185 to Jacoves, filed Feb. 22, 2000 and entitled "Internet Usage for Fuel Reward," 23 pages.

* cited by examiner

SYSTEMS AND METHODS FOR SELF-GENERATION OF E-COUPONS

CROSS-REFERENCE TO RELATED APPLICATIONS

This application is related to commonly owned patent application SYSTEM AND METHOD OF PROVIDING MULTIPLE LEVEL DISCOUNTS ON CROSS-MARKETED PRODUCTS AND DISCOUNTING A PRICE-PER-UNIT-VOLUME OF GASOLINE, U.S. Pat. No. 6,332,128, filed on Feb. 19, 1999; A METHOD OF PROVIDING PRICE-PER-UNIT DISCOUNTS FOR FUEL TO A CUSTOMER, U.S. patent Ser. No. 10/764,930, filed on Jan. 26, 2004; SYSTEM AND METHOD FOR DISCOUNTING FUEL, U.S. patent application Ser. No. 11/158,674, filed on Jun. 22, 2005; SYSTEMS AND METHODS FOR REDEEMING E-COUPONS, U.S. patent application Ser. No. 12/832,788, filed on Jul. 8, 2010 and SYSTEMS AND METHODS FOR E-COUPON TIES AMOUNG PLURAL PARTIES, U.S. patent application Ser. No. 12/960,055 filed concurrently herewith, all of the above-referenced applications are hereby incorporated by reference herein.

TECHNICAL FIELD

This disclosure relates to product and service discounting in general and more particularly to systems and methods for self generation of E-coupons for a product or service.

BACKGROUND OF THE INVENTION

E-coupons have been gaining favor for some time now. There are many methods of delivering the E-coupons to the consumer. In some situations, the coupon is printed in the newspaper, or on an advertisement flyer, and then scanned into a cell phone or other electronic device. In other scenarios, a customer goes to a website and logs on. The log-on process associates the user with an affinity card (or some other form of identification, such as an electronic wallet) and then allows the user to associate one or more coupons with the user. These coupons (E-coupons) usually provide for a discount to the user when the user buys the product associated with the coupon. In actual operation, in one scenario, the user goes to the website, clicks on a picture of a the coupon (say a coupon for a 40¢ discount on a jar of peanut butter of a certain brand) and the user's ID account is credited with a 40¢ discount. The user then goes to the particular store (if the E-coupon is limited to one store) or to any store if the E-coupon is valid at any store, and buys the jar of peanut butter and presents the affinity card (or other identification) to the checkout clerk (POS). The POS system then subtracts the E-coupon discount from the purchase price of the peanut butter.

As noted above, these arrangements are growing in popularity and there are many scenarios for their use. One goal of the E-coupon is drive behavior of the user. Thus, the user is encouraged to buy a certain product or service, such as a certain brand of peanut butter if the user is to save 40¢. Because the E-coupon may be limited to being used at a certain store, E-coupons may be used to motivate customers to shop at store X instead of going to another store that carries the same peanut butter. In other situations, the E-coupon is product specific so as to drive users to buy a particular product or service at any store.

However, in all of the known scenarios the E-coupon is generated by, or on behalf of, the manufacturer or merchant, and then the customer redeems the E-coupon. These scenarios all require forethought on the part of the manufacturer or merchant and create time delays between the time the E-coupon is created and the behavior that is being motivated. Also, the creation of E-coupons is rigid in that they are designed to appeal to a wide audience spectrum and thus are not individualized for personal preferences or for driving behavior of people outside the target segment.

BRIEF SUMMARY OF THE INVENTION

Systems and methods are presented for allowing E-coupons to be generated by a customer based, at least in part, by actions taken by the customer. In one embodiment, a pyramid arrangement is disclosed in which the customer obtains E-coupons based primarily on activities performed by someone else in the pyramid. In another embodiment, the customer may make a purchase and credits for that purchase may be applied to another customer's account in the form of an E-coupon.

In still another embodiment, it may be possible for a customer to negotiate for the purchase of a particular product or service by having the merchant provide an E-coupon that is good for a discount on the same or some other product. The amount of the E-coupon discount could be negotiable even if the price of the product being purchased is not. Thus, a customer about to buy a brand X car might negotiate with the brand X merchant to provide the customer an E-coupon for, say, 1,000 gallons of fuel at a 10¢ per gallon discount off of the pump price for the fuel. The E-coupon could be redeemable at a particular fuel merchant, at a particular chain of merchants, at a particular syndication of merchants or perhaps at any fuel merchant. In this last scenario, the customer could negotiate for more gallons (say 1,500 gallons instead of 1,000) and/or for a steeper discount (say 15¢ per gallon discount) or some combination thereof.

In one scenario, the customer would have the ability to transfer one or more E-coupons to one or more other customers. This transfer could occur by transferring the E-coupon from an affinity account of the donor customer to an affinity account of the recipient customer.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

The processes depicted in the flow charts can be run on one or more processors under software code control. In some embodiments, some or all of the code can be permanently stored or changeable as desired. Some of these processors can be central, for example in a web-based system, or could be local to a specific device.

Figure 1:
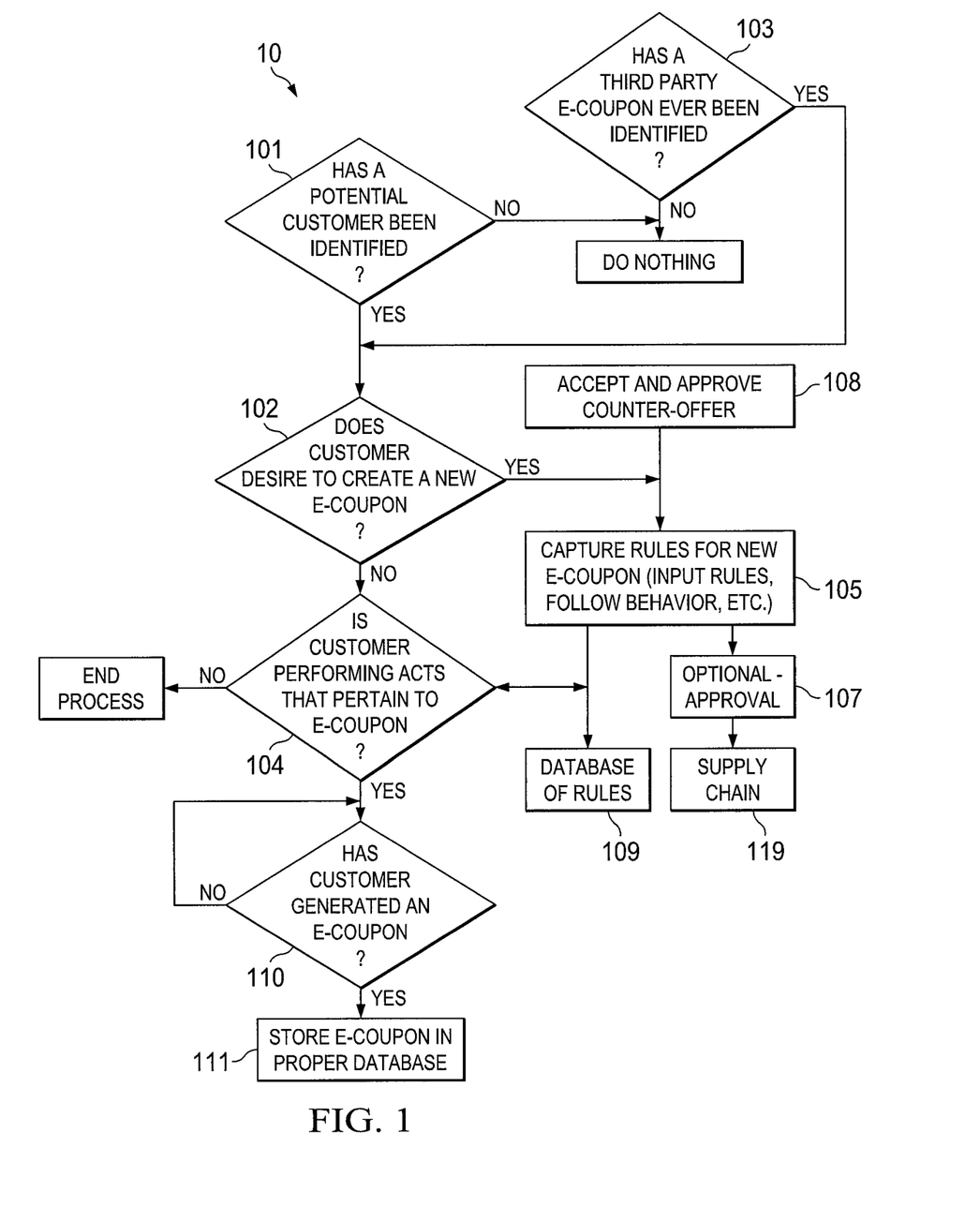
FIG. 1 illustrates one embodiment of a flow chart for allowing a customer to create rules for the subsequent generation of E-coupons.

FIG. 1 illustrates one embodiment 10 of a flow chart for allowing a customer to create rules for the subsequent generation of E-coupons. Process 101 identifies a user as either a potential customer or process 103 third party creator. In this context, third party creators can be any entity not affiliated with the supply chain of the product or service for which the E-coupon is being created. A supply or distribution chain is anyone in the chain extending from manufacturer to retailer and including, but not limited to, the product or service distributor, sales and marketing team, and wholesaler. In the context of identification, credit, debit and/or affinity cards can be detected at a location or the party might log onto a server or other device using a conventionally communicated ID, such as a user name, and perhaps a PIN. In some applications, the ID input device would physically receive the ID, such as by swiping a card, etc. In other applications, the ID would be entered electronically, such as by near field transmission, Bluetooth, etc.

Process 102 then determines if the identified party desires to create a new E-coupon for either his/her own use or for the use of some other party. If a new coupon is to be created process 105 captures the rules set up by the identified party such as a potential customer or third party creator. Process 109 then stores the rules in a database under its control. In some situations, there may have to be approval by someone in the supply chain and, if so, process 107 obtains such approval. This approval could be simply that the rules and discounts set up by the third party fall within a predetermined bound of acceptability such as a predefined range as stored in a database (not shown). In other situations, two way communications (often via wireless transmission) can occur between approval process 107 and the appropriate entity in the supply chain via process 119. This approval may be multilevel and could, for example, depend upon the type of rules being established or by the extent of the discount or other thing of value being supplied by the E-coupon. For example, an approval may be received from a salesperson to a certain threshold of extent of the discount or value. Any discount beyond that threshold may require approval from a higher level authority. Also, approval may be received in the form of a counteroffer. If the party required to approve does not approve this requested E-coupon rule, it may approve of a counteroffer for a different value or product enabling more flexibility and synthesizing more of a bargaining process. Counter offers can be accepted by process 108 under user control, if desired.

If process 102 determines that a new E-coupon is not being created then process 104 determines if the customer is performing acts, such as making particular purchases or using certain services, that are covered by any of the rules previously established to which that customer is currently entitled. A portion of this process determines eligibility of the particular customer based, for example, on the user's ID and rules associated with that particular user.

Process 110 determines if the customer has fulfilled all the obligations of a particular rule set, and when he/she has satisfied that rule set, an E-coupon is generated. The E-coupon is then stored under control of process 111 in association with the customer's account entitling that customer to receive something of value in exchange for presentation of the E-coupon.

Note that while the term E-coupon is used herein, what we are actually discussing is an electronic entitlement that represents something of value to the holder of the entitlement. The entitlement, for example, could be a fuel discount. It could be a discount for any product or service. It could be an admission ticket to a theater or sporting event, or for riding public transportation. The point being that the user, or some other user, not associated with the supply chain pertaining to a particular entitlement can create the entitlement at least in part separately from anyone associated with the supply chain.

Figure 2:
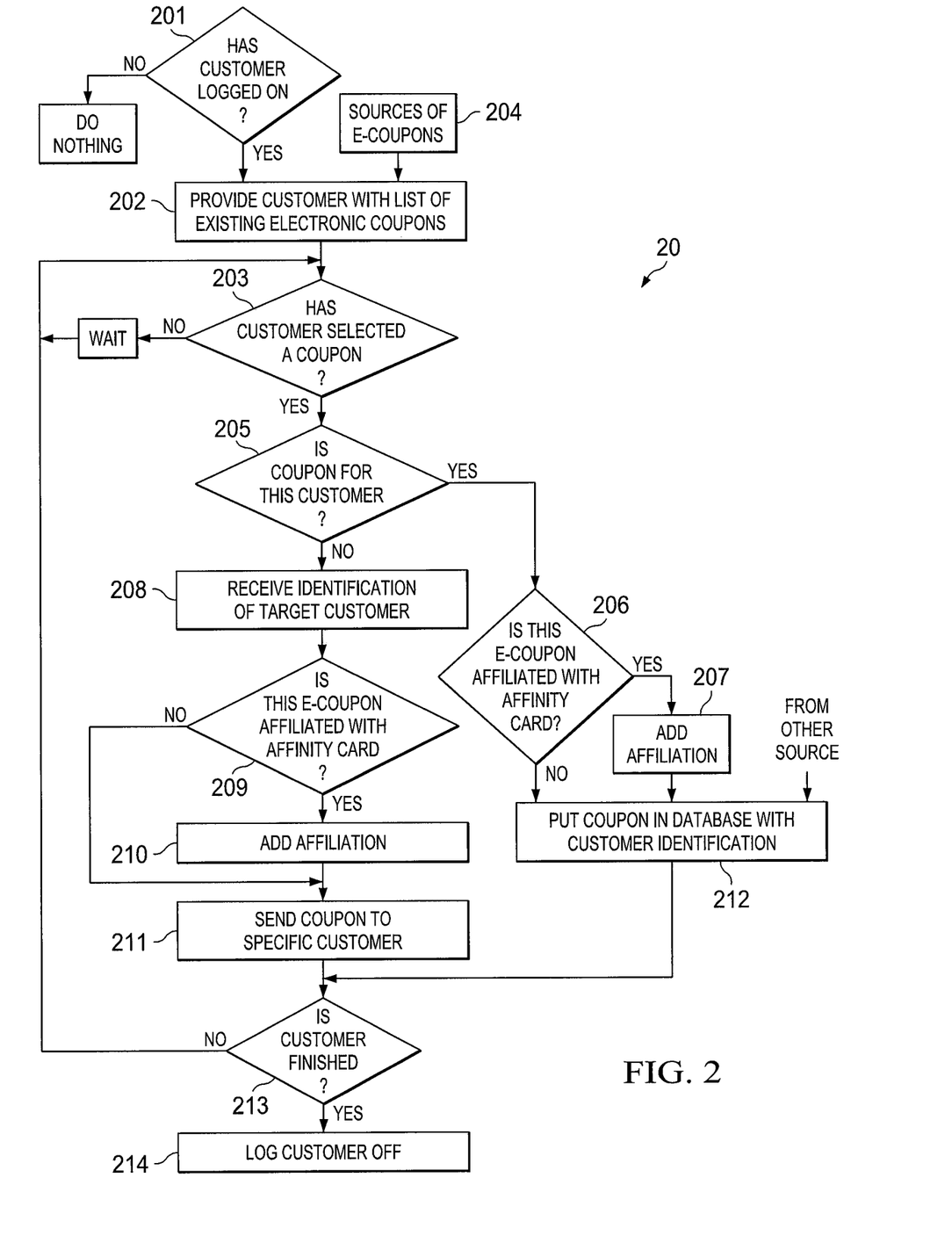
FIG. 2 is a flow chart showing one embodiment of a method for associating E-coupons with a specific customer.

FIG. 2 is a flow chart showing one embodiment 20 of a method for associating E-coupons with a specific customer. In this embodiment, the linking of the customer to the coupon is performed via an electronic portal, such as computer, not shown in FIG. 2, which connects the user to a website via a server not shown in FIG. 2. Under control of software, hardware and/or firmware running the server, process 201 determines if the customer has properly logged on to the system.

If so, then process 202 provides the customer access to one or more coupons and other promotions. As discussed above, the customer is then free to select for his/her or may be for some other account and the desired coupons and promotions. In a preferred embodiment, some or all of the E-coupons will be sent to the user by or on behalf of the E-coupon issuer. One embodiment of this transfer is done by process 204 sending E-coupons for storage in a database via process 205. In some situations, one or more of these coupons require a qualifying event to occur before they can be redeemed. In the case of fuel discounts in our example, the customer must first purchase a quantity of other products before the fuel discount is redeemable. Note that the qualifying event could be scalable such that discounts on fuel vary depending upon the amount of the total purchase; or even perhaps by which products are purchased from which manufacturer.

Process 203 determines if the user has selected a coupon, promotion or any other item for deposit in storage. If so, process 204 determines if the coupon is for this customer or if it is for a third party, perhaps as a gift, rebate, credit, etc. If process 206 determines that the coupon is to be transferred to a third party, process 207 receives identification of the target recipient user. This identification can come from input provided by the user on a one-time basis or could be under control of a rule provided by the user, or possibly by a rule provided by the E-coupon issuer.

If process 208 determines that the E-coupon is to be affiliated with a specific account, such as an affinity card, then process 209 makes the affiliation by, for example, sending a message to the affiliation card processor or by attaching a notation to the E-coupon prior to sending it to the target user.

Once the target user is selected, process 210 sends the coupon to the database or processing center associated with the desired third party. In one embodiment, this third party E-coupon would arrive via input A to process 206 of the proper third party.

Assuming now that an E-coupon is incoming from a sending user then process 211 properly stores the incoming E-coupon, in one example, in a database, such as a database in memory 12-3. If there is an affiliation tag associated with the incoming coupon then proper action is taken under control of process 211 to associate the coupon with the proper affinity card. This could be, for example, sending data the affinity card pertaining to the incoming E-coupon.

The target user is not logged on in this scenario because the E-coupons are arriving from another source. Therefore, process 212 defaults to NO. Since the target customer is not logged on, there is no need to log him/her off at this point.

Figure 3:
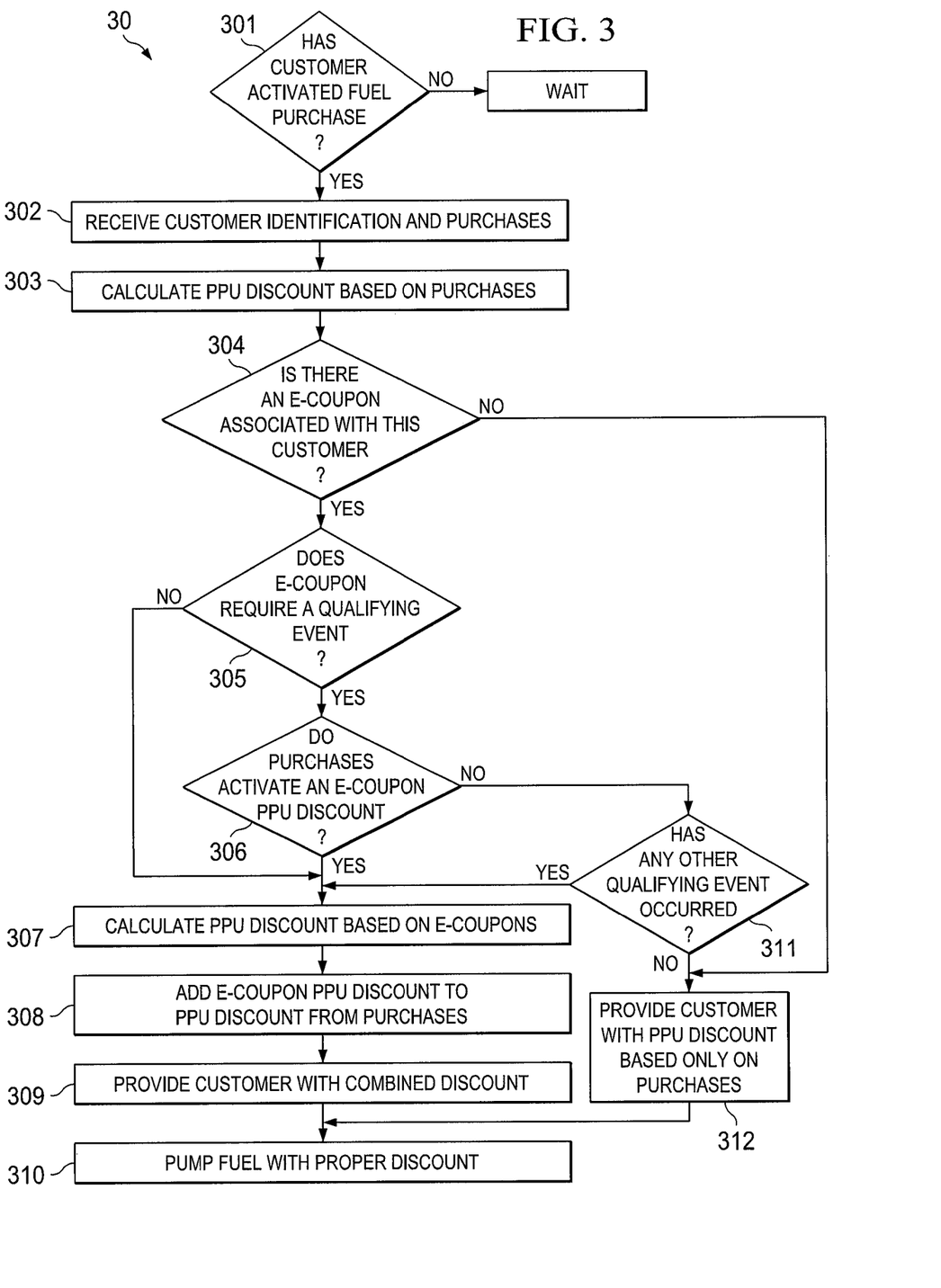
FIG. 3 is a flow chart showing one embodiment of a method for redeeming the E-coupons by the E-coupon recipient.

FIG. 3 is a flow chart showing one embodiment 30 of a method for redeeming E-coupons only after a qualifying event has occurred. The embodiment being discussed pertains to the purchase of fuel by a customer and process 301 determines that the customer has activated a fuel purchase. However, any consumer action can use the concepts discussed herein. Process 302 determines the customer's ID as discussed above. This can be by use of an affinity card, credit card, debit card, some other electronic means, or manual customer input.

Process 303 then determines a proper discount, if any, based upon the amount of purchases or other "awards" held in the account of the identified user. As discussed above, the discount can be achieved in any manner such that the customer ultimately spends less for fuel than he/she would have otherwise paid. This discount then can be characterized as a price per unit (PPU) discount, a cents-off discount, a credit, a roll back, or in any other manner. Process 304 determines whether the customer has an E-coupon or other promotion and, if so, whether any such E-coupon or promotion requires a pre-qualifying event to occur prior to redemption. If any such pre-qualifying event is necessary, process 305 calculates the proper reward such as a further fuel discount, and process 306, in combination with process 307, adds the discount to any other discount available to the customer at this time. Again, this second discount then can be characterized as a PPU discount, a cents-off discount, a credit, a roll back or in any other manner. Note that in some situations, the E-coupon redemption would be for a product or service other than a fuel discount. For example, the qualifying condition could entitle the customer to a car wash, a promotional item, a food coupon, etc. Process 308 controls the pumping of the fuel (or controlling the discount for other services) at the proper price as determined by processes 305 and 307. Also note that process 306 could check the system to see if any other discounts apply, or could apply if an action were to be taken. The system then calculates any such other discounts and informs the customer, or informs the customer that if the customer were to perform some action, then additional discounts or awards would be available.

In some situations, the qualifying event is something other than simply making purchases. In such a situation, processes 310 and 311 control. For example, the pre-qualifying event could be previous purchases of fuel totaling a certain amount, or buying five car washes, etc.

Figure 4:
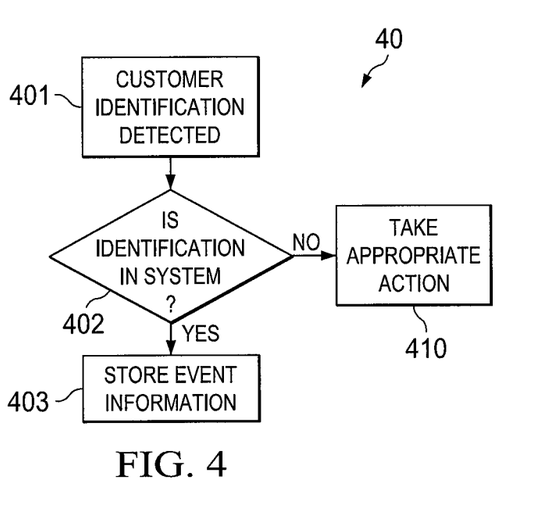
FIG. 4 is a flow chart showing one embodiment of a method for determining and storing specific events pertaining to the customer.

FIG. 4 is a flow chart showing one embodiment 40 of a method for determining and storing specific events pertaining to the customer. In process 401, in one example, the user's ID is detected at a location. Process 402 then determines if the user is in the system. If not, process 410 takes appropriate action under the circumstances. If so, process 403 tracks and records certain actions performed by the customer, one or more of which actions could qualify as a pre-condition for the subsequent redemption of an E-coupon.

Figure 5:
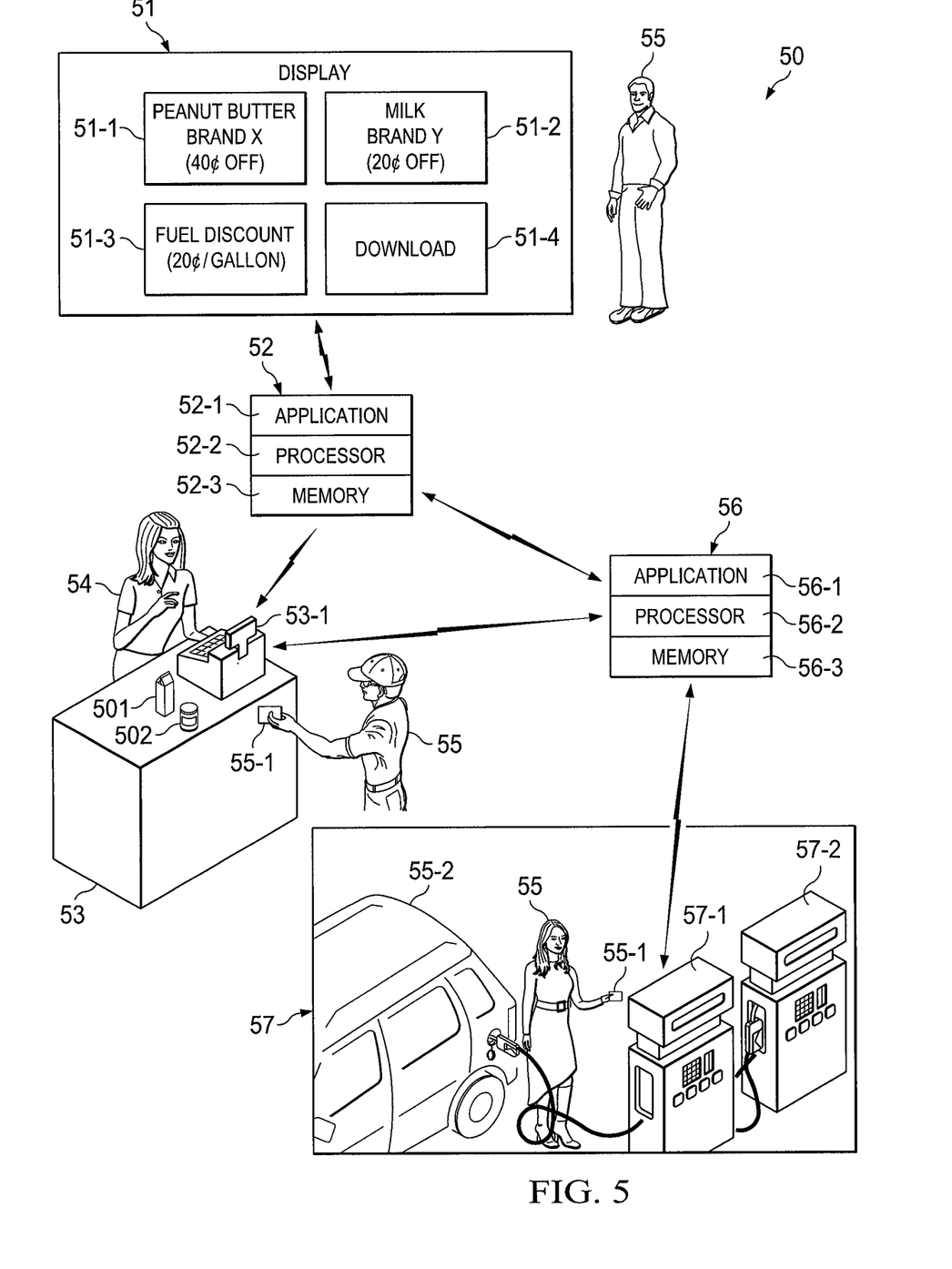
FIG. 5 illustrates one embodiment of a system using the concepts of the invention to issue E-coupons and to redeem the coupons only after a qualifying event has occurred.

FIG. 5 illustrates one embodiment of a system, such system 50, using the concepts of the invention to issue E-coupons and to redeem the coupons only after a qualifying event has occurred. The E-coupons can be created, as discussed herein, using the application processors or memories of system 52 or system 56. A user, such as user 55, in one embodiment, reviews display 51 and selects one or more electronic coupons (E-coupons) 51-1 to 51-3 by selecting the desired displayed logo coupon. Such selection can be by touch sensitive screen, running a mouse over the logo, remote IR or sound "clicker" or by any other selection process. The system then places the selected coupon in a database in a location associated with the user, based on some form of established relationship between the user and the coupon. This relationship can be by using a particular affinity card, a credit card, a debit card, an electronic wallet or any other form of linkage of a database entry to a specific person or in some cases a group of people. For example, one user may select a particular E-coupon such as for fuel discounts and link the selected coupon to an account where multiple users, like a family or a business may be able to use that same account to obtain fuel discounts.

Note that more than one card can be associated with a user account, and that other devices, such as cell phones, debit cards, credit cards, or electronic ID devices, can be used to identify a user or group of users at a POS for redemption purposes. In some situations, the actual E-coupon information can be loaded onto the card or device and in other situations the coupon information is stored in a database, such as database 52-3 under control of processor 52-2 and application 52-1. If the information is to be stored on a physical card then the card would be brought into proximity with display 51 or computer 52, unless the card had a wireless interface in which case the coupon information could be transmitted without close physical proximity. In some situations, near field data transfers can be used to exchange information with an ID source for correlation purposes.

By way of example, assume user 55 desires to download peanut butter coupon 51-1, milk coupon 51-2 and fuel discount coupon 51-3 to his/her affinity card. The user would select each of these and then select download button 51-4, and the three coupons would become associated (as will be discussed hereinafter) with user 55. Note that while the coupons are shown on the display, they could have been printed in a newspaper or on a bill board and scanned usually by reading a code from an offer. Where reading a code from an offer may be performed by entering some input such as a bar code or other symbol associated with the coupon into the system by a scanner, some other interface device, or simply by manual input means, such as a keypad or vocal input. In some situations, the coupon could be presented in a streaming video format, as displayed on a TV, cell phone, PDA, computer, or the like. The user would simply enable a key or clicker when the coupon is visible, and the system would then associate the coupon with the enabling user.

The peanut butter and milk coupons are redeemed by buying those respective items at a particular store, while the fuel discount coupon is one in which the discount is conditioned upon a qualifying event. In this example, the qualifying event is the purchase of goods or services from a particular merchant, whether it be in a physical store, an on-line store, or otherwise. Note that "store" in the context of this document means any store sharing a common affinity.

The example that we have been discussing contemplates that the user has selected certain desired E-coupons. In other scenarios, it is possible that the E-coupon for a particular user or group of users is populated in a database without user control. Examples of such situations would be when E-coupons are randomly sent to a user or to an account as in a lottery sent from a third person, or sent as a result of some activity event by either the user or some third party. Another example of population without user control would be when a lottery winner has E-coupons deposited into an account or sub-account based on some random event. Another example would occur when a company places certain E-coupons in a common account for use by employees all sharing a common ID. Another example would occur when a merchant deposits E-coupons into the accounts of anyone who is visiting the merchant's store or on the merchant's website randomly or at a given time. Also, an E-coupon could be deposited into anyone's account by buying a certain product at a certain store at certain time. In other situations, E-coupons could also be deposited as a rebate, credit or as a result of points achieved by the user for actions taken or not taken by or on behalf of the user, such as a consumer survey.

Continuing in FIG. 5, user 55 (also called herein customer 55) would go to a store associated with the coupon and make whatever purchases the user desired. The user would then scan or otherwise use his/her affinity card 55-1 or electronic wallet to provide a customer ID. This ID is then entered into the system, for example via cash register 53-1 under control of check out clerk 54. The price of peanut butter 502 and milk 501 that the user selected would be discounted by the amount specified in the E-coupon. The store that the user selected is one that provides a discount on subsequent fuel purchases based upon the costs of purchases. Accordingly, the customer's purchase information is then stored in memory 56-3 of computer 56 under control of application 56-1 and processor 56-2. Example of price per unit (PPU) fuel discount systems and methods are shown in one or more of the above-identified patents and applications.

At some later point in time, customer 55 drives his/her car 55-2 into fuel station 57 and begins the fueling process by inputting, perhaps by using affinity card 55-1, or some other means for identifying the user with an account having associated E-coupons. This ID information is put into pump 57-1. The system then determines the discount that customer 55 is entitled to based upon the purchases made at the store and based also upon fuel discount E-coupon 51-3. Note that the discount can be a PPU discount, a roll-back discount (where the pump shows the full price and then the total is reduced based on the E-coupon) or a credit given for the difference. In some situations, the credit could be provided on a subsequent statement received by the user. Thus, the price charged to the user's credit or debit card can be the full amount of the pump price and then a certain amount of the charge (or debit) is removed or otherwise credited to the user at a subsequent time.

Recalling that coupon 51-3 is one that requires a qualifying event before it can be used for fuel discount purposes, the system, as will be discussed, checks to be certain all preexisting conditions are met and then adds the E-coupon fuel discount to any other fuel discount to which the customer is entitled.

Note that while the scenario discussed above uses the user's affinity card, other mechanisms linking an ID with a coupon could be employed. For example, a cell phone or other electronic device can be used as a smart card. When using ID systems that do not rely on physical touching, simply walking into or near a store could serve to link the customer to the store and electronic coupons, if desired.

Figure 6:
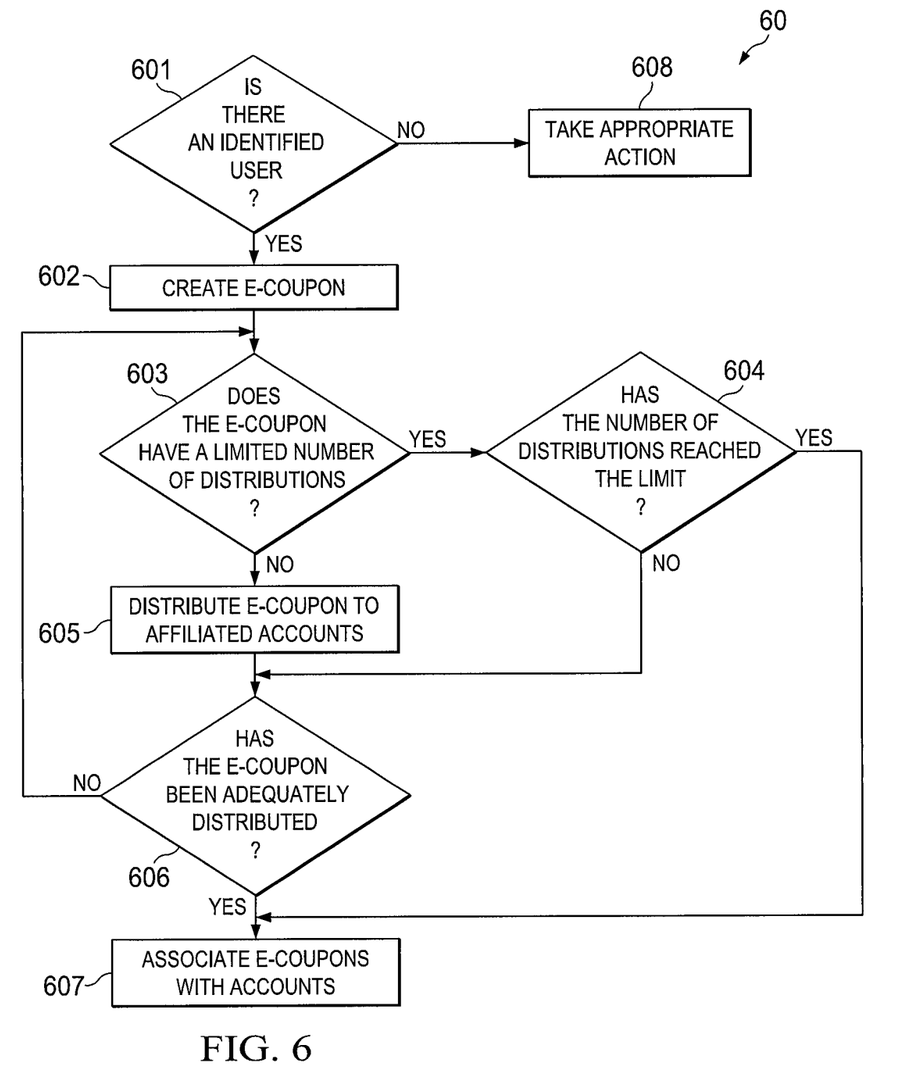
FIG. 6 shows an embodiment of a flow chart in which some users receive E-coupon entitlements based on the activities of other users.

FIG. 6 shows an embodiment of flow chart 60 in which some users receive E-coupon entitlements based on the activities of other users. Embodiment 60 can, for example, use processor 52-2 and memory 52-3 as shown in FIG. 5, if desired. Process 601 determines if a user has been identified as a potential customer or third party creator. Process 601 will determine whether a user has been identified regardless of whether the user is creating an E-coupon or performing some qualifying action. If process 601 determines that there is an identified user, then process 602 creates an E-coupon for said user or a third party. Once the E-coupon has been created, process 603 determines if that E-coupon has a limited number of distributions (discussed below) available. If there is a limited number of distributions, process 604 determines if the number of distributions performed has matched or exceeded that limit. In one scenario, the limit may be zero preventing any further distribution. If the number of distributions has not been exceeded, then process 605 distributes the E-coupon to all accounts affiliated with the user or some account designated by the user. In some situations, process 605 could act on behalf of the E-coupon issuer (or redeemer) and modify the terms of the E-coupon based, at least in part, on parameters pertaining to the new E-coupon holder. These parameters could be, for example, gender of the holder, location of the holder, other activities/purchases of the holder, etc.

Distributions may be made using equivalent E-coupons or may be made scalable. For example, the creator of the E-coupon or person acting to receive an E-coupon may receive a greater or lesser percent discount, may be entitled to a higher or lower cost service, or may receive a higher or lower valued E-coupon. In another scenario, the creator may create an E-coupon that provides a greater discount to those who are part of a group of preferred users and a lesser discount to the general consuming public.

Accounts are affiliated when the accounts have some relationship that would make an issuer want to associate the accounts. For example, in some scenarios the accounts might actually be linked such as employee accounts managed by an employer, accounts within a family or group of friends, or the accounts might be affiliated due to some referral situation where some accounts have referred or been referred by others. This referral could include referrals for initial account creation or voluntary association with a previously created account. Another example of affiliated accounts occurs when a manufacturer, card issuer, E-coupon issuer, or another party has a group of preferred users.

A group of preferred users would include any grouping that a manufacturer or distributor makes to provide the group with additional products, services, or discounts that are not typically available to the general consuming public. For example, a group of preferred users could be a grouping of clients, users with good credit, users that have spent a certain dollar amount on certain products or services, users that have spent a certain dollar amount with certain merchants, or anyone owning membership in a club even if the club allows people to join based solely on the person's desire or signature, such as a store's customer card club. Another example could a grouping of users by similarities such as interests, ages, income, etc. Accounts may also be temporarily affiliated by allowing the user to donate the E-coupon or entitlement or by allowing the user to designate whether said user wanted to transfer the current E-coupon or potential distributions to other accounts. These transfers could be specific to an ID specified by the user, specific to similar members, or possibly could be distributed through some random lottery either constrained by similarities or applicable to all users.

Returning to FIG. 6, once process 605 has distributed one iteration of E-coupons or entitlements, process 606 determines if the E-coupons have been adequately distributed to available users. In one embodiment, adequate distribution would occur when all users entitled to the E-coupon have no affiliated accounts that have not received the entitlement. Once the E-coupon has been adequately distributed, process 607 associates the E-coupons to all the identified entitled users. If the E-coupon has not been adequately distributed then process 603 would again control.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for controlling pumping of a fuel product by a fuel pump, said method comprising:
   receiving, at a processor of an entity, a set of rules from an identified user who is a potential customer of said entity, said set of rules originated by the identified user to create a new E-coupon, wherein said set of rules includes a rule that sets an amount of a discount and an amount of the fuel product to which the discount applies;
   determining, by the processor of the entity, whether the amount of the discount exceeds a predefined threshold value beyond which approval by a salesperson is not authorized;
   generating, at the processor, an accepted set of rules, based on said set of rules, to store in a database, wherein the generating comprises:
      in dependence on a first determination that the amount of the discount does not exceed the predefined threshold value, obtaining, by the processor, an approval from the salesperson to accept said set of rules as said accepted set of rules; or
      in dependence on a second determination that the amount of the discount exceeds the predefined threshold value, obtaining an approval from the higher authority, wherein said obtaining includes establishing, by the processor of the entity, a two way wireless connection to the higher authority in response to the determination that the amount of the discount exceeds the predefined threshold value, wherein the approval is received from the higher authority over the two way wireless connection in a form of a counteroffer to become said accepted set of rules;
   storing said accepted set of rules; and
   controlling pumping of the fuel product, by the fuel pump, according to said stored accepted set of rules by applying said accepted set of rules to the amount of the fuel product to generate a discount, wherein said accepted set of rules are used to facilitate distribution of E-coupons to other users with affiliated accounts, and wherein the affiliated accounts comprise at least one of the following: family accounts of the identified user, employer accounts of the identified user, and group of friends accounts of the identified user.

2. The method of claim 1 wherein the affiliated accounts comprise a grouping of users grouped by manufacturers and distributors for providing additional discounts and services.

3. The method of claim 1 wherein said distribution of the E-coupons to the other users with the affiliated accounts is comprised of E-coupons that differ in value.

4. The method of claim 1 wherein said distribution of the E-coupons to the other users with the affiliated accounts is comprised of E-coupons that differ in product provided.

5. The method of claim 1 wherein said distribution of the E-coupons to the other users with the affiliated accounts is comprised of E-coupons that differ in service provided.

6. The method of claim 1 wherein said distribution of the E-coupons to the other users with the affiliated accounts is limited to a certain number by an E-coupon issuer.

7. The method of claim 1 further comprising:
   determining when said potential customer has performed acts sufficient to generate the new E-coupon based upon the accepted set of rules.

8. A system for controlling pumping of a fuel product by a fuel pump, said method comprising:
   means for receiving, for an entity, a set of rules from an identified user who is a potential customer of said entity, said set of rules originated by the identified user to create a new E-coupon, wherein said set of rules includes a rule that sets an amount of a discount and an amount of the fuel product to which the discount applies, wherein said means for receiving includes receipt, at a processor of the entity from another entity, a counteroffer for a different amount of the discount applicable to the amount of the fuel product;
   means for determining, by the processor of the entity, whether the amount of the discount exceeds a predefined threshold value beyond which approval by a salesperson is not authorized;
   means for generating, at the processor, an accepted set of rules based on said set of rules to store in a database, wherein the generating comprises:
      in dependence on a first determination that the amount of the discount does not exceed the predefined threshold value, obtaining, by the processor, an approval from the salesperson to accept said set of rules as said accepted set of rules; or in dependence on a second determination that the amount of the discount exceeds the predefined threshold value, obtaining an approval from the higher authority, wherein said obtaining includes establishing, by the processor of the entity, a two way wireless connection to the higher authority in response to the determination that the amount of the discount exceeds the predefined threshold value, wherein the approval is received from the higher authority over the two way wireless connection in a form of a counteroffer to become said accepted set of rules;

storing said accepted set of rules; and controlling pumping of the fuel product, by the fuel pump, according to said stored accepted set of rules by applying said accepted set of rules to the amount of the fuel product to generate a discount, wherein said accepted set of rules are used to facilitate distribution of E-coupons to other users with affiliated accounts, and wherein the affiliated accounts comprise at least one of the following: family accounts of the identified user, employer accounts of the identified user, and group of friends accounts of the identified user.

9. The system of claim 8 wherein affiliated accounts comprise a grouping of users grouped by manufacturers and distributors for providing additional discounts and services.

10. The system of claim 8 wherein said distribution of E-coupons to the affiliated accounts is comprised of E-coupons that differ in value.

11. The system of claim 8 wherein said distribution of E-coupons to the affiliated accounts is comprised of E-coupons that differ in product provided.

12. The system of claim 8 wherein said distribution of E-coupons to the affiliated accounts is comprised of E-coupons that differ in a type of service provided.

13. The system of claim 8 wherein said distributions are limited to a certain number by an E-coupon issuer.

14. The system of claim 8 further comprising:

means for determining when said potential customer has performed acts sufficient to generate the new E-coupon based upon the accepted set of rules.

15. A system for controlling pumping of a fuel product by a fuel pump, said system comprising:

a processor for use by an entity in receiving a set of rules from an identified user who is a potential customer of said entity, said set of rules originated by the identified user to create a new E-coupon, wherein said set of rules includes a rule that sets an amount of a discount and an amount of the fuel product to which the discount applies, wherein the processor of the entity is configured to receive from another entity, a counteroffer for a different amount of the discount applicable to the amount of the fuel product, wherein said processor is configured to:

determine whether the amount of the discount exceeds a predefined threshold value beyond which approval by a salesperson is not authorized;

generate an accepted set of rules based on said set of rules to store in a database, wherein the generating comprises:

in dependence on a first determination that the amount of the discount does not exceed the predefined threshold value, obtain an approval from the salesperson to accept said set of rules as said accepted set of rules; or in dependence on a second determination that the amount of the discount exceeds the predefined threshold value, obtain an approval from an authority having a higher level than the salesperson in a supply chain of the fuel product, wherein obtaining the approval comprises: establishing a two way wireless connection to the other entity in response to the selection of the other entity, wherein the approval is received from the other entity over the two way wireless connection in a form of the counteroffer to become said accepted set of rules;

store said accepted set of rules from said identified user; and a point-of-sale system adapted to pump the fuel product according to the stored accepted set of rules by applying said accepted set of rules to the amount of the fuel product to generate a discount, wherein said accepted set of rules are used to facilitate distribution of E-coupons to other users with affiliated accounts, and wherein the affiliated accounts comprise at least one of the following: family accounts of the identified user, employer accounts of the identified user, and group of friends accounts of the identified user.

16. The system of claim 15 wherein said accepted set of rules are used to distribute the E-coupons to the other users with the affiliated accounts.

\* \* \* \* \*

UNITED STATES PATENT AND TRADEMARK OFFICE
CERTIFICATE OF CORRECTION

PATENT NO. : 11,157,935 B1
APPLICATION NO. : 12/960072
DATED : October 26, 2021
INVENTOR(S) : Dickson Perry et al.

Page 1 of 1

It is certified that error appears in the above-identified patent and that said Letters Patent is hereby corrected as shown below:

In the Claims

At Column 10, Claim number 8, Line number 47, delete "said method comprising" and replace with --said system comprising--.
At Column 11, Claim number 9, Line number 27, delete "wherein affiliated accounts" and replace with --wherein the affiliated accounts--.
At Column 11, Claim number 10, starting at Line number 30, delete "distribution of E-coupons to the affiliated accounts" and replace with --distribution of the E-coupons to the other users with the affiliated accounts--.
At Column 11, Claim number 11, starting at Line number 33, delete "distribution of E-coupons to the affiliated accounts" and replace with --distribution of the E-coupons to the other users with the affiliated accounts--.
At Column 11, Claim number 12, starting at Line number 36, delete "distribution of E-coupons to the affiliated accounts" and replace with --distribution of the E-coupons to the other users with the affiliated accounts--.
At Column 11, Claim number 13, starting at Line number 39, delete "wherein said distributions are limited" and replace with --wherein said distribution of the E-coupons to the other users with the affiliated accounts is limited--.

Signed and Sealed this
Twenty-eighth Day of December, 2021

Drew Hirshfeld
*Performing the Functions and Duties of the
Under Secretary of Commerce for Intellectual Property and
Director of the United States Patent and Trademark Office*